June 12, 1923.                                                              1,458,920
F. J. TROLL
ROAD BEARING METER
Filed Oct. 25, 1919              2 Sheets-Sheet 2
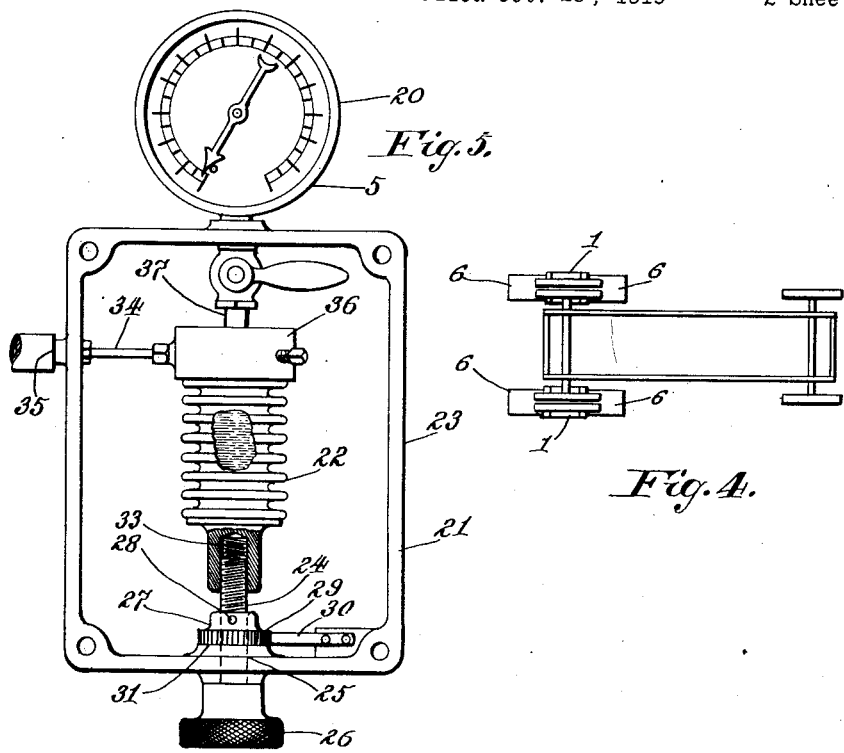
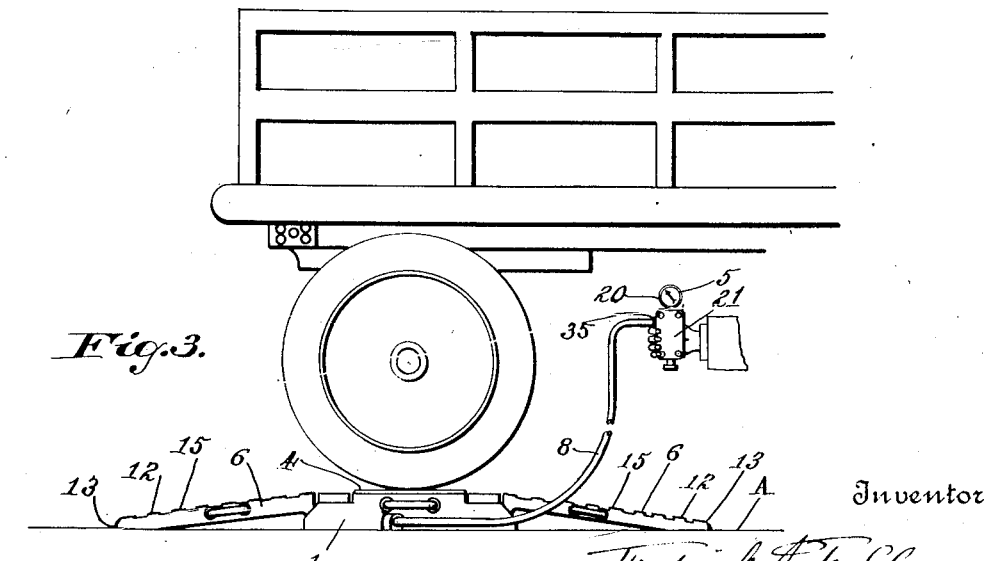
Inventor
Frederick J. Troll
Witnesses
By
Attorney Patented June 12, 1923.

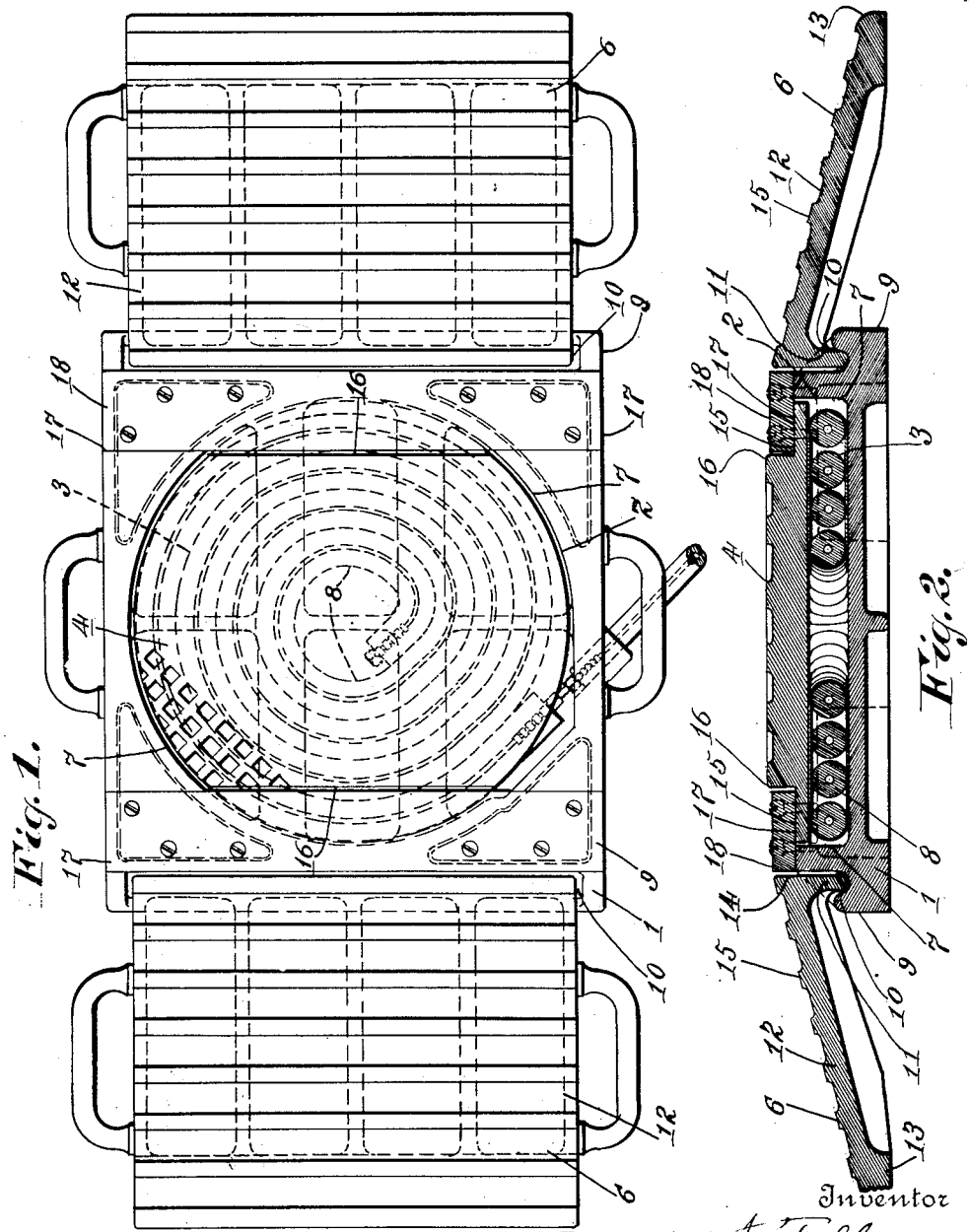

1,458,920

UNITED STATES PATENT OFFICE.

FREDERICK J. TROLL, OF BALTIMORE, MARYLAND, ASSIGNOR TO THE LOADOMETER COMPANY, A CORPORATION OF DELAWARE.

ROAD-BEARING METER.

Application filed October 25, 1919. Serial No. 333,315.

*To all whom it may concern:*

Be it known that I, FREDERICK J. TROLL, a citizen of the United States of America, residing in the city of Baltimore, State of Maryland, have invented certain new and useful Improvements in Road-Bearing Meters, of which the following is a specification.

The destruction of road surfaces incident to heavy traffic, particularly motor vehicle traffic, has resulted in legislation limiting the weight per unit of tire width which may be carried on road vehicles. The territory in which such legislation is enforced is being rapidly extended, though the adoption of such laws has been retarded on account of the difficulties incident to inspection. Where violation of the law in this regard is merely suspected, to compel the driver of a heavily loaded vehicle to depart from his route, in order that the vehicle and load might be weighed, would work extreme hardship and often injustice.

The present invention is intended to overcome this difficulty by providing a convenient portable device for determining the bearing pressure on tires. This apparatus may be used either by the operator of the vehicle to avoid violation of the law, or by traffic officers and the like to detect such violations, the same being adapted to be carried conveniently by a traffic officer in his machine, and of such weight that it can be removed from the machine and handled and arranged for operation by one man. It is also comparatively inexpensive, so that it may logically be a part of the equipment, as are the speedometer, and other testing and indicating devices, as air gauges, jacks, etc.

The apparatus consists of a portable yielding support, having means for indicating the weight borne by the support, the same being of small dimensions and low or flat, and adapted to be placed beneath any one of the wheels of a road vehicle to determine the weight borne by it. As the most convenient means of getting it beneath the wheel is to place it in the road and run the wheel on to it, a run-way is a convenient, if not a necessary part of the equipment, and the run-way or runways are preferably made detachable, so that the weighing member or support may be handled separately from the run-way and if desired, used separately therefrom. In the accompanying drawing I have illustrated in detail a portable road-pressure meter, combining my invention in its preferred form.

As a means particularly adapted to the accurate measurement of the heavy weights which must be dealt with in this connection, there is shown in connection with the invention in its preferred form a coil or other arrangement of flexible tubing, containing fluid which operates in connection with a fluid pressure gauge, to determine the pressure on the yielding support, the coil of tubing being so placed that the pressure of the yielding member is applied directly to its lateral surfaces.

The tubing used is preferably of comparatively heavy cross-section, presenting sufficient resistance without internal support to carry any load which may be applied to the apparatus without injury to the walls of the tubing. This makes maintenance of the fluid pressure within the tubing not essential to the preservation of the apparatus. To prevent concentration of pressure, or weight of the load at any one point on the coil or fluid container, particularly when the vehicle runs onto or off of the support and presses the edges of the same, I have provided a shield, which extends well toward the center of the coil and supports the wheel until it is well away from the periphery of the coil. My road bearing meter is utilized in connection with a weighing method which is a part of my invention. It has been ascertained by calculation that the bearing pressure exerted by a wheel cannot be accurately determined when that wheel is raised by inclining the axle but that the axle must be maintained substantially parallel to the surface, the pressure on which is to be ascertained. By using my road bearing meters in pairs spaced apart by the width of the tread so that the wheels may be run on them in pairs, it is made possible to read all four wheels correctly with comparatively little effort or a maximum reading may be obtained by merely running over the meters thus placed.

It has also been found that the total load which in a number of States must be ascertained before any action can be taken under the law for overloading, can be ascertained by adding the readings as to all four wheels as thus read.

The method of my invention therefore consists in providing a plurality of weighing platforms placed in the path of the vehicle and spaced to correspond to the tread, running the vehicle wheels on to the platforms and adding the readings obtained for the four wheels.

In the drawings, Figure 1, is a plan of the support and run-ways.

Figure 2 is a vertical longitudinal section of the same.

Figure 3 is a side elevation of the apparatus, showing a portion of a road vehicle with a wheel resting thereon in operative position for determining the road pressure.

Figure 4 is a diagrammatic plan, showing two units or meters, one under each of the rear wheels of the road vehicle.

Figure 5 is an elevation illustrating the pressure gauge, or measuring device by which the bearing pressure is read or indicated.

The apparatus as shown consists of a frame, or base, 1, having an upwardly disposed guiding opening, 2, containing a resilient member, 3, and a yielding support, 4, cooperating with the guiding opening, 2, and resting on the yielding member, 3, with an indicator, 5, connected to said resilient means to indicate the pressure thereon in the desired unit. The apparatus, as shown, also includes run-ways, 6, detachably connected with the base and inclined downward from the plane of the top surface of the yielding support, 4, to the road A.

More particularly, the base, 1, is a casting of comparatively small vertical dimensions, shown as square in plan, and having a central aperture or chamber, 2, which is circular in plan and straight as to its side walls, 7, which are substantially vertical. This guiding chamber in the casting is open at the top for the full area of the cross-section, and contains a yielding support, 4, which is of similar shape as its cross-section, but of slightly less area, so that it works freely up and down in the guiding chamber. This yielding support, 4, which bears a similar relation to the chamber, 2, to that of an engine or pump piston to its cylinder, rests upon resilient member, 3, which in the present instance is shown in the form of a coil of heavy rubber tubing, 8, which tends to maintain the yielding support near the level of the top of the frame, 1. The base, 1, is shown as provided, adjacent to opposite sides, 9, with horizontal grooves, 10, parallel to these sides, and spaced below the top of the casting. These grooves receive downwardly disposed tongues, 11, on the edges of the run-ways, 12, which are tapered and curved as to their lower edges, 13, and shaped as to their upper edges, 14, to cooperate with the base, and to bring the edge of the top surface of each run-way adjacent to the base casting to the top of the base or frame as hereinafter described.

The yielding support, 4, already described as circular in plan, is shouldered or depressed as to two edge segments, 15, at the front and back, the shoulders being on the line of parallel chords, 16, of the circle. The casting referred to as the base or frame, 1, is correspondingly shouldered as to the areas, 17, extending across the same adjacent and parallel to said chords, and extending out to the edges or sides, 9, of the base, to which the run-ways are attached, and each shoulder or depressed portion is filled by means of a rectangular bar of metal, 18, extending along the corresponding edge of the frame, and covering a segmental portion of the chamber, 2, so that the inner edge of each bar, 18, is adjacent and parallel to the corresponding chords and shoulder, 16, and overlies the depressed segment of the circular yielding member, 4.

In the form of the invention shown, the weight on the yielding support, 4, is read by means of a fluid pressure indicator connected to a body of fluid under pressure, in the tube or container, 8. Such a pressure indicator is shown generally at 20 in Figure 5. It may be of any well known or preferred commercial type. In connection with the pressure indicator, 20, I have shown a pressure regulating or adjusting device, 21, by means of which the fluid pressure may from time to time be adjusted to the desired minimum reading, corresponding to no weight on the yielding support, 4, to compensate for leakage and evaporation of the fluid, and the like, so that the instrument may be read direct in pounds of weight on the yielding support, without correction for variation of the minimum fluid pressure. This regulating or adjusting device may be of any suitable type. As shown, it consists of a collapsible container, 22, mounted in a frame or case, 23. The frame carries a screw, 24, rotating freely in a thrust bearing, 25, in the frame, and having a knurled head, 26, by means of which it may be conveniently turned. On the opposite side of the bearing, 25, from the knurled head, 26, is a collar, 27, on the screw, secured thereto by means of a pin, 28, or otherwise. The pin is provided with ratchet teeth, 29, engaged by a leaf spring or spring pawl, 30, on the frame, to prevent rotation of the same from adjusted position. The collar, 27, acts as an abutment, engaging the face, 31, of the thrust bearing 25. In this instance, the screw engages a threaded socket, 33, at the end of the accordion sack or bellows, 22, which is connected to the fluid in the system by a tube, 34. This tube leads to a nipple, 35, to which the rubber hose or tube, 8, is connected. The base, 36, of the collapsible container, 22, is connected to a pipe, 37, which acts in part as a support, secured to and leading through the frame or box, 21, to the indicator, 20.

It is apparent that the adjusting device with the collapsible container, 22, being connected to the fluid in the system, any desired minimum pressure being chosen, at which the gauge will indicate zero for no weight on the yielding support, 4, the adjusting device will serve to regulate the pressure to this desired minimum to bring the indicator to zero.

In Figure 4, I have illustrated a method of weighing motor vehicles in transit which consists in placing a plurality of weighing instruments 1, in the path of the vehicle wheels said weighing instruments being spaced apart to correspond to the width of the tread, running the wheels on to the weighing instruments and combining the readings for the respective wheels to give the total weight or the average wheel pressure, or utilizing the readings separately as indicating the pressure exerted by the respective wheels.

The operation of the entire apparatus has been fully set forth in the specification. The important function of the apparatus is the determination of wheel bearing pressure, by indicating the weight on each wheel of the vehicle being tested, and the advantages of the present apparatus are that it is conveniently portable and easily applied or used, in that it is not only easily handled, but is of such short vertical dimension that it can be placed in the road near the wheel of the vehicle to be tested, and the wheel can be run in to testing position without difficulty, or the wheel may be jacked up and the testing member thrust under it when it is released from the jack, placing the weight carried by the wheel on the testing member.

The elastic or resilient element of the present device is particularly adapted to this purpose, being extremely sensitive and uniform as to the correctness of the result at all capacities; also it is of extremely long life and fool-proof, in that it cannot be injured by variation of the fluid pressure in the system, or by application of the greatest load which will be encountered.

I have thus described specifically, and in detail the apparatus embodying my invention, in order that its nature and operation may be clearly understood; however, the specific terms are used descriptively, rather than in a limited sense, the scope of the invention being defined in the claims.

What I claim and desire to secure by Letters Patent is:

1. A manually portable road bearing pressure meter, comprising a portable base of short vertical dimension, a weight supporting member with guiding means in the base, a resilient member within the base beneath said supporting member, the same having sufficient resistance to support the wheel of a loaded truck, and means for indicating the weight on said member.

2. A tire bearing pressure meter, comprising a manually portable apparatus including a base, a platform member and a guide therefor, a resilient member of sufficient resistance to carry a wheel of a loaded truck supporting the platform member, said apparatus being of extremely short vertical dimension and having an inclined portion leading to the platform so that the wheel of a truck can be run onto it without difficulty when it is placed in the roadway and means for indicating the pressure on said resilient member.

3. A tire bearing pressure meter, comprising a portable base, a platform member mounted thereon, a resilient member in the form of a yielding container with fluid under pressure supporting the platform member, and means for indicating said pressure, the apparatus being of extremely short vertical dimension so that the wheel of a truck can be run onto it without difficulty and the yielding container being of sufficient resistance to support a corresponding load.

4. In a portable tire bearing pressure meter, a base of short vertical dimension, a yielding weight supporting platform thereon, a resilient member supporting said yielding member, the resilient member being in the form of a coil of flexible tubing, fluid in said tubing, and means for indicating the pressure to which said fluid is subjected.

5. A bearing pressure meter for roads, comprising a manually portable apparatus, of short vertical dimension having a yielding support for a vehicle wheel the same being of width only sufficient to receive and support a single wheel and means for indicating the pressure on the support.

6. A road bearing pressure meter, the same being portable, comprising a base having a guide for a yielding platform, a yielding platform in said guide, a resilient member beneath said platform, supporting the same, means for leading a vehicle wheel up to the surface of said platform, and a rigid member on the base adjacent to said means, and extending over a portion of said platform to receive the weight of the wheel and support it as it passes over the edge of the yielding member, to prevent concentration of pressure on a limited area of the resilient member.

7. In a road bearing pressure meter, a portable base having a yielding platform, a resilient support for the same, means for indicating the pressure thereon, the base and platform being of short vertical dimension and portable, and a portable runway and means for detachably connecting the latter to the base.

8. In a road bearing pressure meter, a base having a yielding platform, a resilient support for the same, means for indicating the pressure thereon, the base and platform being of short vertical dimension and portable, a portable run-way adapted to be detachably connected to said base, the connecting means consisting of an upwardly disposed groove on the base and a downwardly disposed tongue on the run-way.

9. In a road bearing pressure meter, a base having a yielding platform, a resilient support for the same, means for indicating the pressure thereon, the base and platform being of short vertical dimension and portable, a run-way adapted to be detachably connected to said base, the resilient means being uniformly distributed beneath the yielding platform and a shield extending over the edge of the platform, adjacent to the top of the run-way, to transfer the weight on the wheel to the central portion of the yielding platform, and protect the resilient member from undue concentration of the weight on a limited area thereof.

10. A road bearing pressure meter comprising a base, a yielding platform on the base, a guide therefor, a coil of tubing of resilient material beneath said platform supporting the same, the tubing having thick walls and a small passage, fluid pressure transmission means within said passage, and means connected thereto for reading the pressure on the fluid.

11. A road bearing pressure meter comprising a base, a yielding platform on the base, a guide therefor, a coil of tubing of resilient material beneath said platform supporting the same, the tubing having thick walls and a small passage, fluid pressure transmitting means within said passage, and means connected thereto for reading the pressure on the fluid, the walls of the tubing being sufficiently thick to support the weights to be measured without injury to the tubing in the absence of fluid pressure within the same.

12. A road bearing pressure meter comprising a base, a yielding platform on the base, a guide therefor, a coil of tubing of resilient material beneath said platform supporting the same, the tubing having thick walls, fluid pressure transmitting means within said passage, and means connected thereto for reading the pressure on the fluid, a shield overlying the edge of the yielding platform to support the wheel to an intermediate portion of the platform, to prevent concentration of the weight on the periphery of the coil.

13. A road bearing pressure meter comprising a base, a yielding platform on the base, a guide therefor, a coil of tubing of resilient material beneath said platform supporting the same, the tubing having thick walls and a small passage, fluid pressure transmission means within said passage, and means connected thereto for reading the pressure on the fluid, a run-way for leading the weight on the wheel to the surface of the platform, and a shield adjacent to the run-way, overlying the edge of the platform to transfer the weight to an intermediate portion of the platform.

14. A method of weighing road vehicles and their loads which consists in placing a plurality of manually portable independent weighing units on the surface of the roadway in the path of the wheels, spacing them apart to correspond to the tread, running the respective wheels onto the weighing units, weighing the load on each wheel separately and combining the readings for the respective wheels to give the desired total.

15. A method of determining wheel pressure of road vehicles while the vehicles are on the road, which consists in placing a plurality of manually portable independent weighing units on the roadway in the path of the wheels, spacing them apart to correspond to the tread, running the wheels onto the weighing units and reading the respective weighing units.

16. A method of ascertaining wheel pressure on road surfaces which consists in placing a plurality of manually portable independent weighing units on the surface of the roadway in the path of the wheels, spaced to correspond with the tread and running the wheels over the weighing units, and obtaining the reading of said units.

17. A tire bearing a pressure meter comprising a portable base, a platform member mounted thereon, a resilient member in the form of a yielding container with fluid under pressure supporting the platform, the apparatus being of extremely short vertical dimension so that the wheel of a truck can be run onto it without difficulty and the yielding member being of sufficient resistance to support a corresponding load, means for applying pressure to the fluid in said container and a gauge connected to the fluid body, the pressure applying means serving to adjust the gauge to the desired minimum reading.

18. A tire bearing pressure meter comprising a portable base, a platform member mounted thereon, a resilient member in the form of a yielding container with fluid under pressure supporting the platform, the apparatus being of extremely short vertical dimension so that the wheel of a truck can be run onto it without difficulty and the yielding member being of sufficient resistance to support a corresponding load, means for applying pressure to the fluid in said container and a gauge connected to the fluid body, the pressure applying means serving to adjust the gauge to the desired minimum reading, said gauge being separate from the remainder of the apparatus, and a flexible tube connecting the gauge to the liquid in the container so that the gauge can be held in the hand for reading.

19. A tire bearing pressure meter comprising a portable base, a platform member mounted thereon, a resilient member in the form of a yielding container with fluid under pressure supporting the platform, the apparatus being of extremely short vertical dimension so that the wheel of a truck can be run onto it without difficulty and the yielding member being of sufficient resistance to support a corresponding load, means for applying pressure to the fluid in said container and a gauge connected to the fluid body, the pressure applying means serving to adjust the gauge to the desired minimum reading, said gauge and pressure applying means being separate from the remainder of the apparatus and a flexible tube connecting the gauge and pressure applying means to the liquid in the container so that the gauge and pressure applying means can be held in the hand for reading and for adjustment of the pressure.

Signed by me at Baltimore, Maryland this 21st day of October, 1919.

FREDERICK J. TROLL.

Witnesses:
EMMA AHLSLEGER,
PORTER H. FLAUTT.

DISCLAIMER 1,458,920.—*Frederick J. Troll*, Baltimore, Md. ROAD-BEARING METER. Patent dated June 12, 1923. Disclaimer filed April 30, 1930, by the patentee said *Troll*, the assignee, *The Loadometer Company*, and the sole licensee, *The Black & Decker Manufacturing Company*.

Hereby enter their disclaimer as to claim 15, which reads:

"15. A method of determining wheel pressures of load vehicles while the vehicles are on the road, which consists in placing a plurality of manually portable independent weighing units on the roadway in the path of the wheels, spacing them apart to correspond to the tread, running the wheels on to the weighing units, and reading the respective weighing units."

[*Official Gazette, May 20, 1930.*]